(12) United States Patent
Mishina

(10) Patent No.: US 7,697,044 B2
(45) Date of Patent: Apr. 13, 2010

(54) IMAGE PROCESSING APPARATUS AND IMAGE PROCESSING METHOD

(75) Inventor: Kazuki Mishina, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 732 days.

(21) Appl. No.: 11/512,227

(22) Filed: Aug. 30, 2006

(65) Prior Publication Data

US 2007/0064118 A1 Mar. 22, 2007

(30) Foreign Application Priority Data

Sep. 20, 2005 (JP) .............................. 2005-271494

(51) Int. Cl.
*G06K 9/44* (2006.01)
(52) U.S. Cl. ...................... 348/252; 382/266; 358/3.27
(58) Field of Classification Search ........................ None
See application file for complete search history.

(56) References Cited

U.S. PATENT DOCUMENTS 7,031,516 B2 4/2006 Niko

2002/0067434 A1 6/2002 Niko
2006/0066554 A1* 3/2006 Baba et al. .................... 345/98

FOREIGN PATENT DOCUMENTS

| CN | 1359239 | 7/2002 |
| JP | 60-254893 | 12/1985 |
| JP | 2005-167974 | 6/2005 |

OTHER PUBLICATIONS

China Patent Office issued an Chinese Office Action on Nov. 14, 2008, Application No. 200610138960.X.

* cited by examiner

*Primary Examiner*—David L Ometz
*Assistant Examiner*—Angel L Garces-Rivera
(74) *Attorney, Agent, or Firm*—Young & Thompson

(57) ABSTRACT

The image processing apparatus includes an RGB-YUV converter for converting a color image into a luminance signal and a color difference signal and a YUV false color remover for removing false color based on the luminance signal Y and the color difference signals U, V. The false color remover includes an edge intensity calculator for calculating edge intensity based on the luminance signal Y, a modulation coefficient calculator for calculating a modulation coefficient so that a degree of modulation is greater as the edge intensity is higher, and a UV modulator for modulating a color difference signal having a value smaller than a prescribed threshold based on the degree of modulation.

3 Claims, 4 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method capable of reducing false color that appears when using a 1CCD image pickup device, for example.

2. Description of Related Art

An image pickup apparatus that employs a 1CCD system with a single charge coupled device (CCD) as an image pickup device can only produce a spectral sensitivity with a reduced shade when it captures an image just as it is. In order to produce a color image, it is common to place a color filter having a prescribed pattern on a light receiving surface of a photoreceptor for each pixel and capture an image.

Because each pixel of an image obtained by such image capturing has a single color component only, the image is mosaic in color in accordance with the pattern of the color filter used. Thus, on each pixel of the mosaic image, other color components which the pixel does not have are interpolated, thereby creating a color image in which all pixels have all color components.

In a 3 CCD system, incident light is separated into three primary color light beams by a prism, and different light beams are detected by different CCDs. Because this system separate color information of an original object into three primary colors of R, G and B and allocates a CCD for each of them, it is necessary to use triple CCDs to obtain the same area of image and requires a complicated mechanism, thus being costly. This system still enables creation of a rapid high-resolution image with high color reproducibility.

In a 1CCD color camera, a color interpolation process that interpolates a missing color component based on prediction is required structurally. The color interpolation process creates data of a color that does not exist in a target pixel by estimation from the pixel values of pixels in the vicinity of the target pixel. Thus, in a portion where a pixel value sharply changes such as an edge portion, an accurate value cannot be calculated in many cases. As a result, a pixel having an inaccurate color balance can exist at an edge portion, which causes false color to appear, deteriorating image quality.

An image processing method that aims to easily and effectively reduce or eliminate false color that appears at an edge portion due to the color interpolation process is disclosed in Japanese Unexamined Patent Application Publication No. 2005-167974 (referred to hereinafter as a related art 1). The image processing method according to the related art 1 performs a color interpolation process on image data, converts the processed image data into a luminance signal and a color difference signal, and performs false color reduction process on the color difference signal. The false color reduction process selects N (N≧4) number of pixels, including a target pixel, that are arranged sequentially in a first direction by a one-dimensional filter and determines an average or intermediate value of the pixel values of the pixels selected by the one-dimensional filter excluding a maximum pixel value and a minimum pixel value to be a pixel value of the target pixel.

That is, it is assumed that the pixel value of a pixel that generates a false color has a higher degree of coloring than the pixel values of the peripheral pixels, and in order to eliminate the pixel having the higher rate (degree) of coloring, the maximum and minimum pixel values of the pixels including the target pixel that are arranged sequentially one-dimensionally are eliminated. Since it can be judged that the rate of coloring increases basically in proportion to the absolute value of the value of the color difference (C) signal, the pixel value can be determined based on the value of the color difference signal (C) that is obtained as a result of YC conversion of the image data after the color interpolation process into a luminance signal and a color difference signal.

Further, a 1CCD color camera that aims to remove transient noise that causes false color to appear is disclosed in Japanese Unexamined Patent Application Publication No. 60-254893 (referred to hereinafter as a related art 2). The 1CCD color camera according to the related art 2 detects an edge portion where a basic frequency sharply changes and eliminates the color difference signal at this edge portion, thereby preventing false coloring from occurring due to transient noise.

Because the interpolation process only considers the signal values of pixels adjacent to the target pixel, it fails to perform an appropriate interpolation process in a boundary (edge) where a signal value of a pixel greatly changes, causing that false color is likely to appear at the edge. As a result, false color is likely to appear in the boundary where a signal value of a pixel changes significantly, such as a boundary of vertically striped patterns or a boundary between a subject image and a background image.

However, the technique disclosed in the related art 1 performs the false color removal process on all pixels using an averaging filter or a median filter after conversion into a YUV signal in order to remove false color. In such a method, the false color removal process is performed unnecessarily on the area other than the edge portion, where false color is not likely to appear. Further, even if the filtering process is performed mainly on the edge portion, because the false color removal process is performed uniformly, a degree of false color removal cannot be adjusted, and the false color removal can fail depending on a pixel.

Further, the technique disclosed in the related art 2 performs false color removal process that masks the modulation in accordance with an absolute value of a color difference signal and determines whether to eliminate a color difference signal or not. In such a method, there is a possibility to eliminate the color difference signal in a portion where false color does not appear, which causes an unnatural image to be created.

SUMMARY OF THE INVENTION

According to an aspect of the present invention, there is provided an image processing apparatus including a signal converter for converting a color image into a luminance signal and a color difference signal, and a false color removal section for performing false color removal processing based on the luminance signal and the color difference signal, wherein the false color removal section modulates the color difference signal with a degree of modulation in accordance with edge intensity calculated based on the luminance signal.

According to another aspect of the present invention, there is provided an image processing method for removing false color appearing on a color image, including converting the color image into a luminance signal and a color difference signal, calculating edge intensity of a target pixel based on luminance signals of the target pixel and peripheral pixels, and modulating the color difference signal in accordance with the edge intensity of the target pixel.

The present invention modulates a color difference signal to a modulation degree in accordance with en edge intensity that is determined based on a luminance signal. This can create a more natural image after false color removal process compared with the case of determining whether to perform modulation depending on the edge intensity, thereby enabling an effective false color removal processing to be performed on a portion where false color is likely to appear.

The present invention can provide an image processing apparatus and an image processing method capable of effectively removing false color caused by an averaging filter or a median filter and creating a natural image after removing false color.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
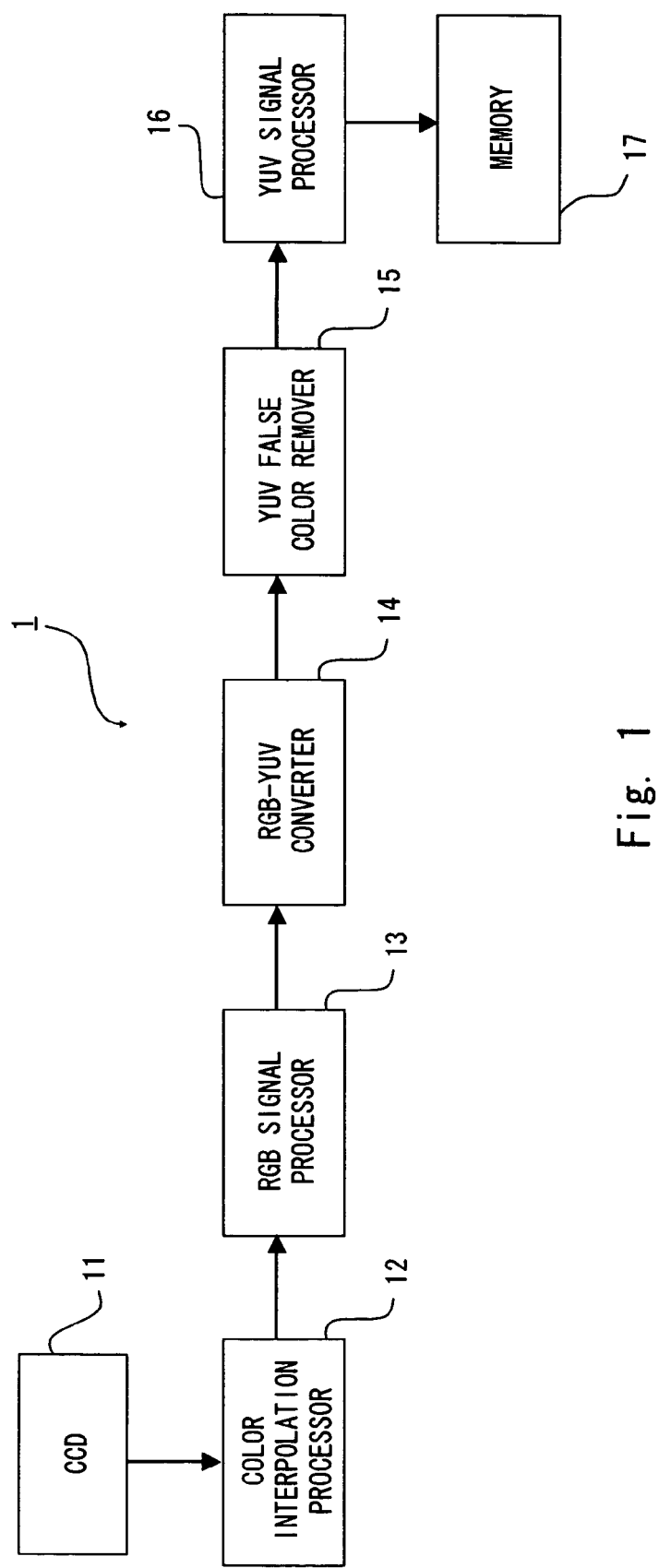
FIG. 1 is a view showing an image processing apparatus according to an embodiment of the present invention.

Exemplary embodiments of the present invention are described hereinafter in detail with reference to the drawings. FIG. 1 illustrates an image processing apparatus according to an embodiment of the present invention. The image processing apparatus 1 includes a CCD 11, a color interpolation processor 12, an RGB signal processor 13, an RGB-YUV converter 14, a YUV false color remover 15, a YUV signal processor 16, and a memory 17.

The color interpolation processor 12 receives an image signal from the CCD 11, interpolates missing color information for each pixel based on prediction from peripheral pixels, and thereby generates RGB (red, green, blue) signals. Though the CCD 11 is a 1CCD image sensor (solid-state image pickup device) that converts an image captured by a lens, which is not shown, into an electrical signal (picture signal) in this embodiment, the image processing apparatus may employ a 3CCD system. In such a case, the image processing apparatus does not need the color interpolation processor.

The CCD 11 is a sensor for detecting the intensity of light and thus cannot identify colors. Therefore, it is common to place a single-color filter for each CCD device and produce a color signal in combination with the signals of several adjacent devices (pixels) in charge of other colors. The filter used may be a primary color filter having light's three primary colors (Red-Green-Blue), a complementary color filter having the complementary colors (Cyan-Magenta-Yellow), or the like. The following description is given on the case of creating RGB signals.

The RGB signal processor 13 corrects shading on an image due to varying sensitivity of the CCD 11. The shading is a phenomenon in which a difference in brightness occurs between a central part and a peripheral part of a monitor when an image of an object having a uniform brightness is captured by a lens and the CCD 11. The RGB signal processor 13 performs a processing for correcting the shading and so on.

The RGB-YUV converter 14 converts the RGB signal supplied from the RGB signal processor 13 into a Y signal (also referred to as a luminance signal or a luminance component), U(Cb)/V(Cr) signal (also referred to as a color difference signal or a color difference component). The U signal is a difference between the luminance signal and the blue color (B) signal, and the V signal is a difference between the luminance signal and the red color (R) signal. The conversion may be implemented according to the following conversion formula:

$$Y=0.299*R+0.587*G+0.114*B$$

$$U=-0.169*R-0.3316*G+0.500*B$$

$$V=0.500*R-0.4186*G-0.0813*B$$

where Y, U, V, R, G, B indicate the signal values (intensity) of a luminance signal, a color difference U signal, a color difference V signal, an R signal, a G signal, and a B signal, respectively. In this embodiment, the values of Y, U and V satisfy the followings:

$0 \leq Y \leq 255$ $-128 \leq U \leq 127$ $-128 \leq V \leq 127$

The YUV false color remover 15 performs false color removal process based on the Y, U and V signals. The false color remover 15 of this embodiment calculates edge intensity of each target pixel based on the luminance signals Y of the target pixel and peripheral pixels and modulates the color difference signals U and V with a degree of modulation in accordance with the edge intensity so as to reduce false color based on the intensity of the color difference signals U and V. The false color remover 15 is detailed later.

The luminance signal Y and the modulated signals U and V after the false color removal process are then supplied to the YUV signal processor 16. The YUV signal processor 16 performs noise removal processing and so on. For example, the YUV signal processor 16 may remove noise by processing each pixel by an averaging filter or a median filter and further perform edge enhancement (edge sharpening) processing for enhancing the edge that is rounded by the filtering, and so on. After that, the signal is converted into the RGB signal and stored in the memory 17 according to need.

Figures 2, 3:
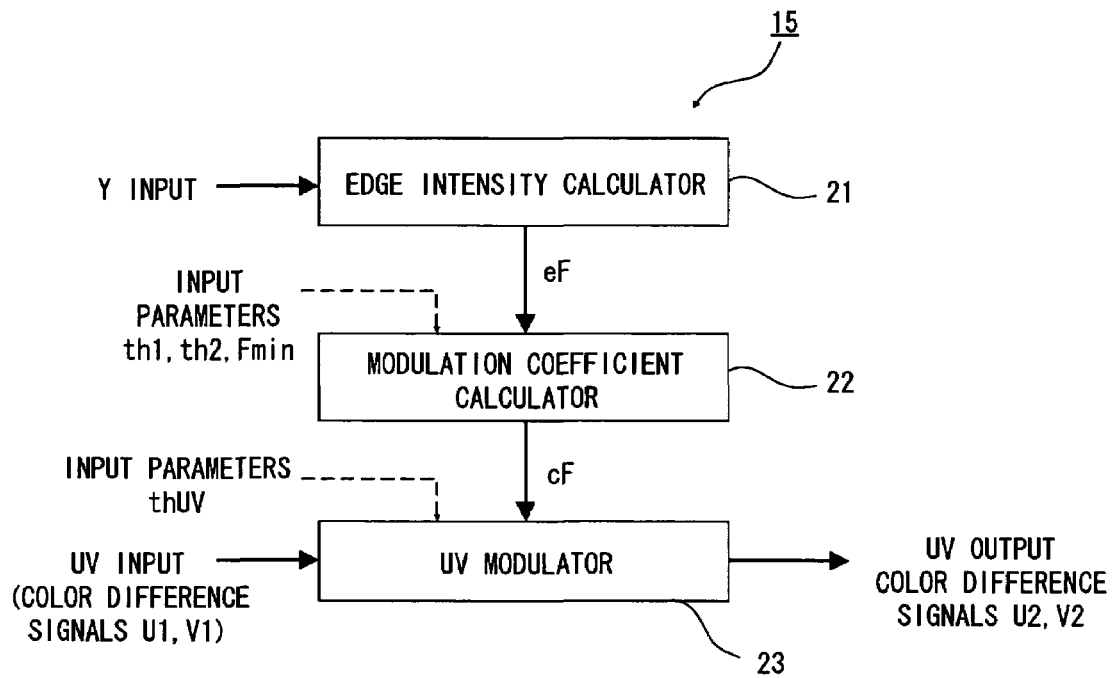
FIG. 2 is a view showing a detail of a YUV false color remover in an image processing apparatus according to an embodiment of the present invention.
FIG. 3 is a view to describe an example of calculating edge intensity in a YUV false color remover in an image processing apparatus according to an embodiment of the present invention.

The YUV false color remover 15 of this embodiment is described in further detail below. FIG. 2 specifically illustrates the YUV false color remover 15. As shown in FIG. 2, the YUV false color remover 15 includes an edge intensity calculator 21 for calculating edge intensity from a luminance signal Y, a modulation coefficient calculator 22 for calculating a modulation coefficient from the edge intensity, and a UV modulator 23 for modulating color difference signals U and V based on the modulation coefficient and outputting the modulated signals. The modulation coefficient calculator 22 serves as a modulation factor determination section that determines a degree of modulation based on the modulation coefficient.

This embodiment first calculates edge intensity, under the assumption that false color is likely to appear in a pixel having high edge intensity. The embodiment then modulates color difference signals so that the signal values are smaller as the edge intensity is higher, thereby performing false color removal processing in accordance with the edge intensity. Adjusting the degree of modulation according to the edge intensity enables more natural modulation to reduce or eliminate false color. If it is assumed merely that false color is likely to occur in a pixel having high edge intensity, there is a possibility that a color difference signal of a pixel where no false color appears can be modulated to a smaller value. To avoid this, this embodiment assumes that false color is likely to appear when edge intensity is high and a value of a color difference signal is smaller than a threshold, and modulates a color difference signal under such an assumption. The processing in each block is detailed hereinafter.

The edge intensity calculator 21 calculates an edge intensity of each pixel. FIG. 3 is a view to describe an example of a calculation method. The calculation method may use luminance signals Y of eight peripheral pixels in the vicinity of a pixel (target pixel) whose edge intensity is to be calculated and calculate edge intensity (eF) of the target pixel by the following convolution filtering:

$$eF=|bii*8-\{(ai)+(aii)+(aiii)+(bi)+(bii)+(biii)+(ci)+(cii)+(ciii)\}|$$

where $0 \leqq eF \leqq 255$, and the value is rounded at 255 if the calculation result exceeds 255. In the above formula, ai, bi, ci and so on indicate the luminance values of the pixels.

Specifically, the edge intensity of the target pixel having a luminance value bii can be obtained by subtracting each luminance value of the eight peripheral pixels from the result of multiplying the luminance value bii of the target pixel by 8. The calculation of the edge intensity is not limited to the above method, and it is possible to employ other arithmetic formulas or use the luminance values of a part of the eight peripheral pixels or other pixels.

Figure 4:
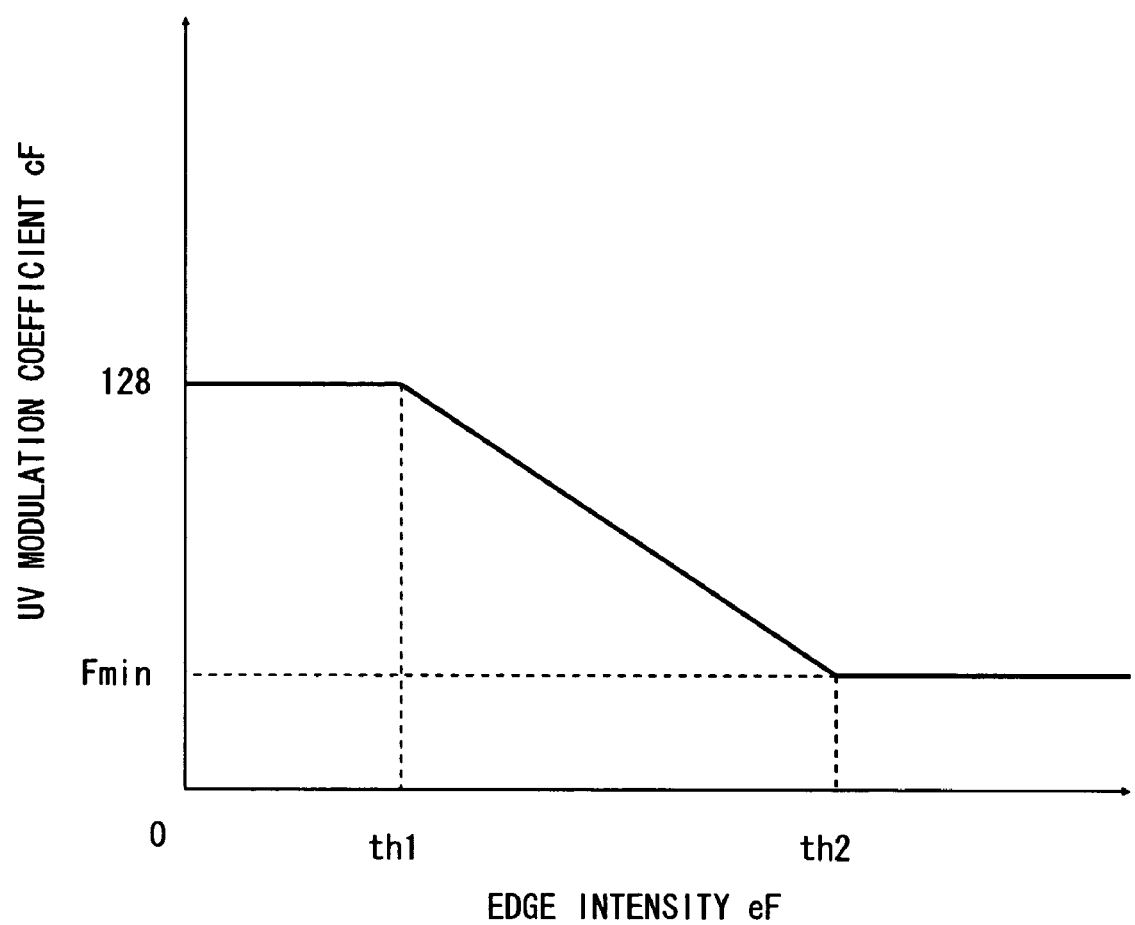
FIG. 4 is a view showing a relationship between edge intensity eF calculated by a YUV false color remover and a UV modulation coefficient cF in an image processing apparatus according to an embodiment of the present invention.

The modulation coefficient calculator 22 calculates a modulation coefficient cF by using the edge intensity eF and predetermined modulation parameter (also referred to as input parameters; th1, th2, Fmin). The modulation coefficient cF uses for modulating the color difference signals U and V. FIG. 4 is a graph showing a relationship between the edge intensity eF and the UV modulation coefficient cF. As the modulation coefficient cF is smaller, the color difference signals U and V are modulated to smaller values. The value of the modulation coefficient cF satisfies: $0 \leqq cF \leqq 128$. As described later, the modulation coefficient cF is used for a modulation factor K=cF/128 so that the modulation is implemented according to the result of each value of the color difference signals U and V times the modulation factor K.

Input parameters (eF, th1, th2, Fmin) and an output parameter (cF) in the modulation coefficient calculator 22 are as below:

Input parameters:
eF: Edge intensity
 $0 \leqq eF \leqq 255$
th1: UV modulation edge intensity first threshold
 $0 \leqq th1 \leqq 254$
th2: UV modulation edge intensity second threshold
 $th1 \leqq th2 \leqq 255$
Fmin: UV modulation multiplication lower limit
 $0 \leqq Fmin \leqq 128$ Output parameter:
cF: UV modulation coefficient
 $0 \leqq cF \leqq 128$ Further,
eF<th1 cF=128

$$th1 \leqq eF \leqq th2\ cF=(th2-eF)*(128-Fmin)/(th2-th1)+Fmin \quad \text{[Expression 1]}$$

eF>th2 cF=Fmin

If the edge intensity eF is lower than the UV modulation edge intensity first threshold th1 as shown in FIG. 4, the modulation coefficient calculator 22 sets the modulation coefficient cF=128. If the modulation coefficient cF=128, the modulation factor K=cF/128=1 as described above. Thus, if the edge intensity eF is lower than the UV modulation edge intensity first threshold th1, no modulation is applied to the color difference signals U and V regardless of the values of the color difference signals U and V.

If the edge intensity eF is a value between the UV modulation edge intensity first threshold th1 and the UV modulation edge intensity second threshold th2, the UV modulation coefficient cF decreases as the edge intensity eF increases as shown in Expression 1 and FIG. 4. Fmin indicates a minimum value of the UV modulation coefficient cF, which is a UV modulation multiplication lower limit.

If the edge intensity eF is higher than the UV modulation edge intensity second threshold th2, the UV modulation coefficient cF is set to the UV modulation multiplication lower limit Fmin, which is a minimum value. In this case, the modulation factor K=Fmin/128=minimum modulation factor k. As described above, when $0 \leqq Fmin<128$ and the UV modulation multiplication lower limit Fmin=0, if the edge intensity eF is higher than the UV modulation edge intensity second threshold th2, the color difference signals U and V are modulated to 0.

Among the input parameters (eF, th1, th2, Fmin) in the modulation coefficient calculator 22, the edge intensity eF is calculated from the luminance singal Y while the other parameters th1, th2 and Fmin are set values. The values of the parameters th1, th2 and Fmin may be preset based on an experimental result or the like. Alternatively, it is possible to set an imaging mode according to a subject of imaging, such as landscape, moving object, portrait, nightscape and so on and adjust the values appropriately according to the imaging mode. It is also is possible to allow a user to adjust a value from a preset default value. If the value of th2 is set closer to the value of th1 or the value of Fmin is set smaller, a gradient of the modulation coefficient shown in FIG. 4 is steeper between th1 and th2. If, on the other hand, the value of th2 is set apart from the value of th1 or the value of Fmin is set greater, the gradient of the modulation coefficient is slower between th1 and th2. In this manner, by adjusting the values of the parameters, the modulation factor (K=cF/128) for modulating the color difference signals can be set larger or smaller according to need. For example, the modulation factor may be set to a large value when a subject of imaging or an imaging mode is such that false color is likely to appear, and it may be set to a small value when a subject of imaging or an imaging mode is such that false color is not likely to appear.

The UV modulator 23 is detailed hereinafter. The UV modulator 23 modulates color difference signals U and V in accordance with the UV modulation coefficient cF. The UV modulator 23 receives color difference signals U and V from the RGB-YUV converter 14 and a modulation coefficient cF as an input parameter from the modulation coefficient calculator 22. The UV modulator 23 determines whether or not to perform modulation based on the values of color difference signals U and V and generates modulated color difference signals U and V using the modulation coefficient cF. In the following description, the color difference signals U and V before modulation supplied from the RGB-YUV converter 14 are referred to as color difference signals U1 and V1, and the color difference signals U and V, both modulated and not modulated, output from the UV modulator 23 are referred to as color difference signals U2 and V2. The UV modulation threshold thUV may be preset or supplied from outside. The UV modulation threshold thUV may be a fixed value or a variable value that can be adjusted appropriately according to an image to be captured or an imaging mode just like the input parameters (th1, th2, Fmin) in the modulation coefficient calculator 22.

The input parameters (cF, thUV) and the UV outputs (color difference signals U2 and V2) of the UV modulator 23 are as below:

Input parameters:
cF: UV modulation coefficient $0 \leq cF \leq 255$
thUV: UV modulation threshold $0 \leq thUV \leq 128$ UV outputs:
when $U1 \geq thUV$ and $V1 \geq thUV$,
$U2=U1, V2=V1$
when $U1 < thUV$ and $V1 < thUV$, $$U2=U1*(cF/128), V2=V1*(cF/128) \quad \text{[Expression 2]}$$

where U2 and V2 are clipped at: $-128 \leq U2, V2 \leq 127$.
The modulation factor $K=cF/128$, and a minimum modulation factor $K=Fmin/128$.

The UV modulator 23 first determines whether the values of input color difference signals U1 and V1 (U1, V1) are equal to or higher than the UV modulation threshold thUV. If the values of input color difference signals U1 and V1 are equal to or higher than the UV modulation threshold thUV, modulation is not performed and the color difference signals U1 and V1 are output without any change as color difference signals U2 and V2. In other words, if the color difference signals U1 and V1 exceed the UV modulation threshold thUV, no modulation is performed in the assumption that false color is not likely to occur. This embodiment thereby avoids that modulation is performed by mistake on a portion where false color does not appear.

If the values of the color difference signals U1 and V1 are less than the threshold thUV, modulation is performed using the modulation coefficient cF. The modulation coefficient cF=128 when edge intensity is less than th1, and the color difference signals U1=U2 and V1=V2. Thus, even when the color difference signals U1 and V1 are less than the threshold thUV, if the edge intensity eF is equal to or less than th1, no modulation is performed just like the above case. If the edge intensity eF is larger than th1, the modulation coefficient cF of less than 128 is supplied so that the color difference signals U1 and V1 are modulated appropriately and output as color difference signals U2 and V2.

Figure 5:
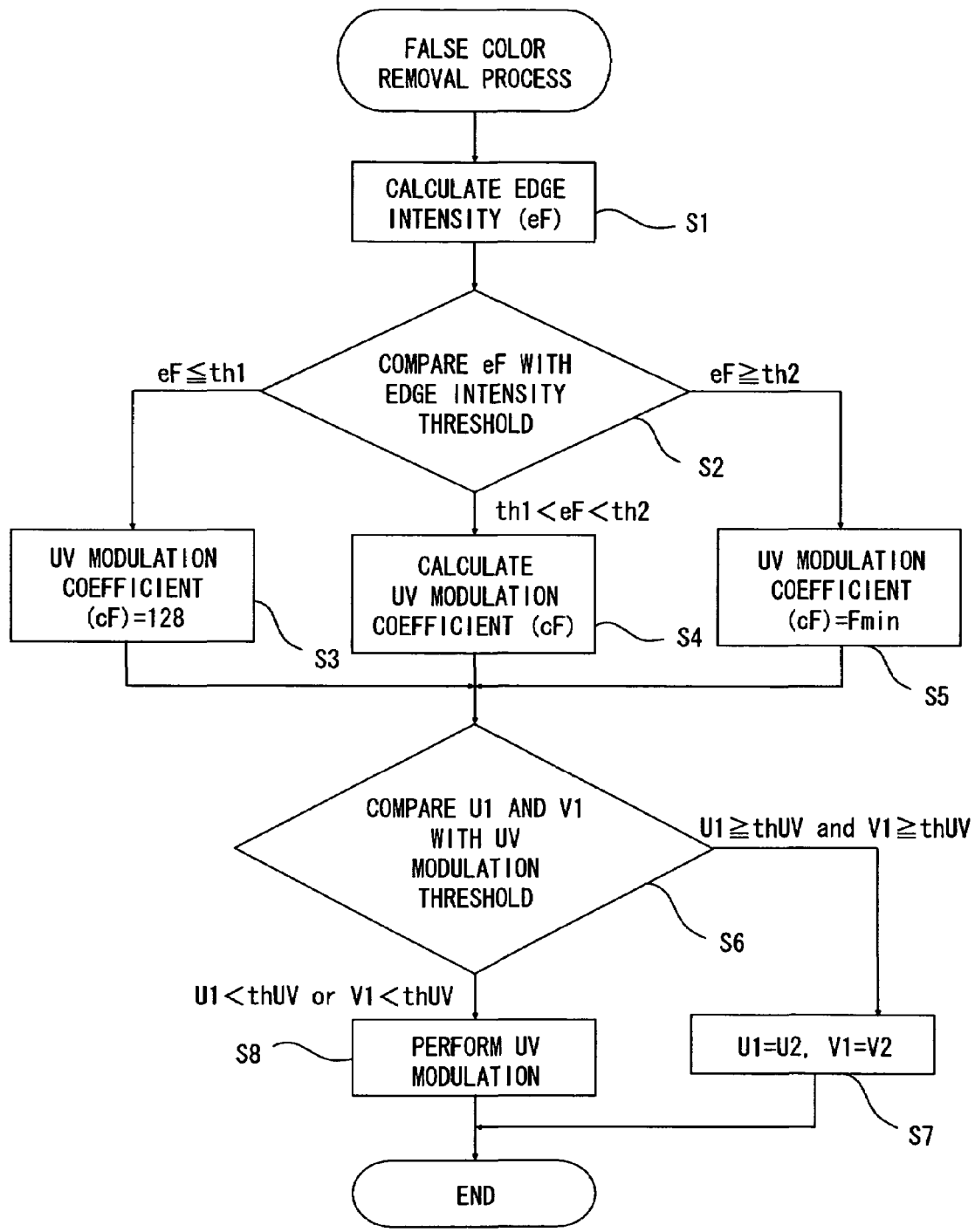
FIG. 5 is a flowchart showing an image processing method according to an embodiment of the present invention.

A removal method in the YUV false color remover 15 is described in further detail hereinbelow. FIG. 5 is a flowchart showing false color removal method. As shown in FIG. 5, the edge intensity calculator 21 first calculates edge intensity eF (Step S1). Then, the modulation coefficient calculator 22 compares the value of the edge intensity eF with the thresholds th1 and th2 (Step S2). If the edge intensity eF satisfies $eF \leq th1$, the UV modulation coefficient cF is fixed to cF=128 (Step S3). If the edge intensity eF satisfies $th1 < eF < th2$, the UV modulation coefficient cF is calculated according to Expression 1 above (Step S4). If the edge intensity eF satisfies $eF \geq th2$, the UV modulation coefficient cF is fixed to cF=Fmin (Step S5).

Then, the UV modulator 23 compares the values of the color difference signals U1 and V1 with the UV modulation threshold thUV (Step S6). If the values of the color difference signals U1 and V1 (U1, V1) are both equal to or greater than the UV modulation threshold thUV, the values of the color difference signals U1 and V1 are output without any change as modulated color difference signals U2 and V2 (Step S7). On the other hand, if either of the values of the color difference signals U1 and V1 (U1, V1) is smaller than the UV modulation threshold thUV, the color difference signals U1 and V1 are modulated according to Expression 2 and output as color difference signals U2 and V2 (Step S8). In the processing of Step S8, even if either of the values of the color difference signals U1 and V1 (U1, V1) is smaller than the UV modulation threshold thUV, when the modulation coefficient cF is set to cF=128 in Step S3, the modulation factor K=cF/128=1 and the color difference signals U1 and V1 are output without any change as modulated color difference signals U2 and V2, just like Step S7.

In this embodiment, the edge intensity of a target pixel is calculated from the luminance signals of the target pixel and peripheral pixels. Further, a modulation coefficient cF for determining a degree of modulation is calculated based on the edge intensity, and color difference signals in the target pixel are modulated to a modulation degree in accordance with the edge intensity. Specifically, as the edge intensity is higher, the degree of modulation is greater, and the color difference signal is modulated in such a way that its absolute value significantly decreases, thereby performing modulation in accordance with the edge intensity. This removes false color and further creates a more natural image after false color removal compared with the case of eliminating a color difference signal in a pixel having high edge intensity.

Particularly, according to the value of the edge intensity in relation to the two thresholds th1 and th2, there are three cases of the edge intensity being less than th1, between th1 and th2, and larger than th2. In the case where the edge intensity is less than th1, no modulation is performed. In the case where the edge intensity is larger than th2, modulation is performed uniformly at a maximum modulation degree. In the case where the edge intensity is from th1 to th2, modulation is performed at a degree of modulation in proportion to edge intensity. Further, setting a variable parameter for determining the degree of modulation enables more accurate false color removal processing in accordance with a subject of imaging or an imaging mode.

Further, it is determined whether to perform modulation based on the value of a color difference signal, regardless of the edge intensity. Specifically, this embodiment modulates a color difference signal in order to reduce false color only when the edge intensity and the color difference signal value satisfy prescribed conditions. Thus, even for a pixel having high edge intensity and a large modulation factor and thus being subject to the process of false color removal, if the value of the color difference signal is large, the color difference signal is not modulated and the process of removing false color is not performed. It is thereby possible to perform the false color removal processing only on the pixel where false color is likely to appear.

The present invention is not limited to the above-described embodiments, and it would be obvious to those skilled in the art that various changes may be made without departing from the scope of the invention. For example, given processing in the blocks of the color interpolation processor 12, the RGB signal processor 13, the RGB-YUV converter 14, the YUV false color remover 15 and the YUV signal processor 16, or the edge intensity calculator 21, the modulation coefficient calculator 22 and the UV modulator 23 that constitute the YUV false color remover 15 may be implemented by executing a computer program on a central processing unit (CPU). In such a case, the computer program may be stored in a recording medium or transmitted over the Internet or other transmission media.

Further, the above components may be integrally disposed inside a single housing such as a mobile telephone, a portable digital camera and a video camera, or a physically separated image output unit may be used. The memory may be built-in or detachable. In addition, though the above embodiment describes a 1CCD image processing apparatus by way of illustration, the present invention is also applicable to 2CCD, 3CCD, or other types of image processing apparatus.

It is apparent that the present invention is not limited to the above embodiment that may be modified and changed without departing from the scope and spirit of the invention.

What is claimed is:

1. An image processing apparatus, comprising:
    a signal converter for converting a color image into a luminance signal and a color difference signal; and
    a false color removal section for performing false color removal processing based on the luminance signal and the color difference signal, the false color removal section comprising an edge intensity calculator for calculating the edge intensity based on the luminance signal, a modulation factor determination section for determining the degree of modulation based on the edge intensity, and a color difference signal modulator for modulating the color difference signal based on the degree of modulation,
    wherein the false color removal section modulates the color difference signal such that a signal value of the color difference signal becomes smaller as an edge intensity, calculated based on the luminance signal, becomes larger,
    wherein the edge intensity calculator determines whether the edge intensity is i) lower than a first threshold th1, ii) between the first threshold th1 and a second threshold th2 that is larger than the first threshold th1, or iii) higher than the second threshold th2,
    wherein the modulation factor determination section determines a modulation factor satisfying modulation minimum value k≦modulation factor K ≦1 (0≦k≦K) based on a determination result of the edge intensity calculator, so that the modulation factor K=1 when the edge intensity is lower than the first threshold th1,
    the modulation factor K being determined in accordance with the edge intensity to satisfy modulation minimum value k≦modulation factor K ≦1 when the edge intensity is between the first threshold th1 and the second threshold th2, and
    the modulation factor K=modulation minimum value k when the edge intensity is higher than the second threshold th2, and
    wherein the color difference signal modulator multiplies a value of the color difference signal by the modulation factor when the color difference signal is smaller than a prescribed threshold to obtain a modulated color difference signal.

2. An image processing method for removing false color appearing on a color image, comprising:
    converting the color image into a luminance signal and a color difference signal;
    calculating edge intensity of a target pixel based on luminance signals of the target pixel and peripheral pixels;
    modulating the color difference signal based on the edge intensity of the target pixel;
    determining whether the edge intensity is i) lower than a first threshold th1, ii) between the first threshold th1 and a second threshold th2 that is larger than the first threshold th1, or iii) higher than the second threshold th2;
    determining a modulation factor K satisfying modulation minimum value k modulation factor K≦(0≦k≦1) based on a determination result; and
    calculating a modulated color difference signal by multiplying the color difference signal of the target pixel by the modulation factor K,
    wherein the calculating a modulated color difference signal calculates the modulated color difference signal with the modulation factor K=1 when the edge intensity is lower than the first threshold th1, calculates the modulated color difference signal with the modulation factor K satisfying modulation minimum value k<modulation factor K<1 when the edge intensity is between the first threshold th1 and the second threshold th2, and calculates the modulated color difference signal with the modulation factor K=modulation minimum value k when the edge intensity is higher than the second threshold th2.

3. The image processing method according to claim 2, wherein the modulating step modulates only a color difference signal in the target pixel having a value smaller than a prescribed threshold.

* * * * *